July 18, 1950  C. W. LANPHERE  2,516,059
VARIABLE SPEED TRANSMISSION
Filed Sept. 25, 1947
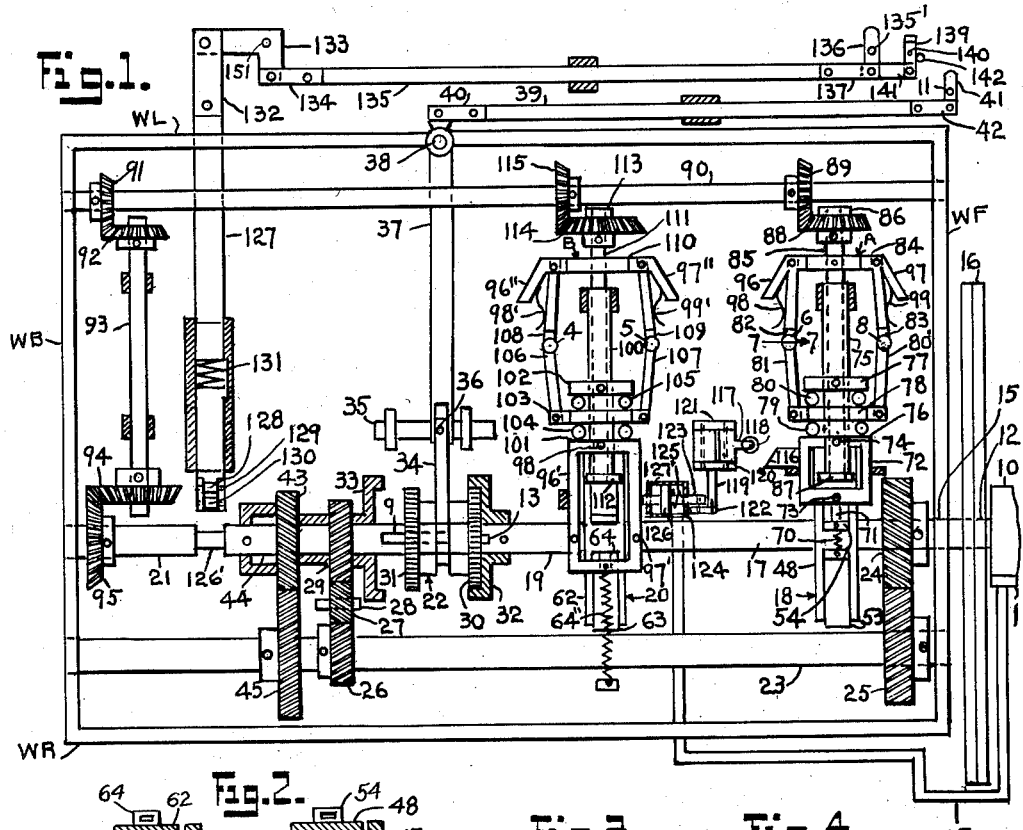
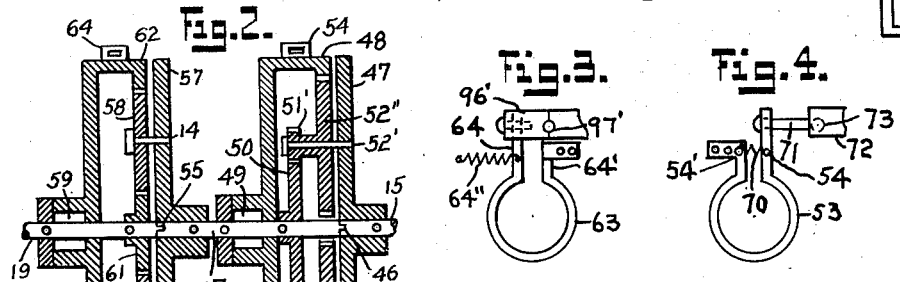
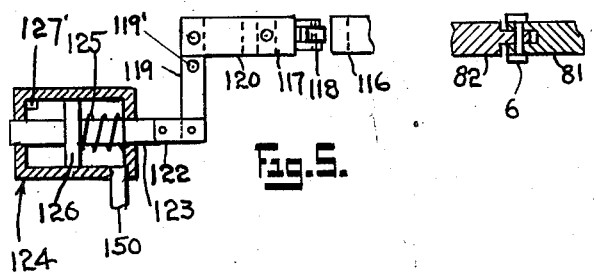
*INVENTOR.*
Clint W Lanphere Patented July 18, 1950

2,516,059

UNITED STATES PATENT OFFICE 2,516,059

VARIABLE-SPEED TRANSMISSION

Clive W. Lanphere, New York, N. Y.

Application September 25, 1947, Serial No. 776,021

5 Claims. (Cl. 74—752)

The present invention (which embodies some structures shown in my Patent 2,379,808) relates to a motor car, speed controlled planetary gear transmission for automatically varying the speed ratio of the motor shaft and car propeller shaft with a continuous engagement of gears in an underdrive unit during the change from a minimum low speed to a direct drive, and continuous meshing gears in an overdrive unit during the change from a direct drive to an overdrive.

One object of my invention is to provide a plurality of planetary gear mechanisms, one an underdrive unit and the other an overdrive unit.

Another object is to provide resilient means for normally holding the brake band on the underdrive unit in braking position on its cooperating orbit gear.

A further object is to provide resilient means for normally holding the overdrive brake band free from its cooperating orbit gear.

A still further object is to incorporate a plurality of centrifugal means also termed governors for gradually setting and releasing brake bands as the case may be, there being one governor for each planetary unit.

One feature is to provide overrunning clutch means for each planetary unit for rotating the drive shaft (main shaft) in direct drive when the planet gears and cooperating orbit gears revolve as a unit and for rotating the drive shaft at less speed or at faster speed than the motor shaft, depending on which planetary unit is so functioning.

Another feature is to incorporate a fluid coupling of any suitable design for connecting the engine or motor shaft with the section of the main shaft that carries a planet gear spider, this coupling allowing slippage between these shafts when the motor idles and the car stands still.

A further feature is to provide an overrunning clutch means that functions in an opposite manner to those in the planetary units, this feature connecting the car propeller shaft with the fluid clutch shaft when the former shaft rotates faster than the clutchshaft as when the car is coasting, and the motor idling, thus providing positive holding means for checking movement of the car.

Another feature is to provide means for holding the car when parked on a grade to offset the slippage in the fluid coupling which occurs when this coupling is not rotating at the necessary speed to produce a coupling effect.

These and other features will be more fully understood by reference to the drawings in which:

Figure 1 is a diagrammatic plan view of the transmission from above and from the right side with some of the elements shown in cross section to more clearly indicate them. It discloses a motor shaft, a fluid coupling, a main shaft comprising several sections, planetary gear units, a countershaft, reverse gear mechanism, car holding means both manual and automatic, centrifugal means for controlling the planetary units, vacuum controlled means for delaying speed ratio changes when the motor is under a heavier load, and other elements which will be described in due course. The main and countershafts are shown in the same plane to better disclose the correlation of the component parts. Obviously the countershaft could be placed below the main shaft. The centrifugal means, or governors could be placed on the opposite side of the main shaft or in any desirable position. By properly arranging the connecting means between the transmission and rear axle the transmission could be placed at the rear of the chassis.

Figure 2 is a diagrammatic cross section of the planetary mechanism showing the gears and cooperating parts.

Figure 3 is a diagrammatic front view of a brake band for the overdrive gear unit.

Figure 4 is a similar view of a brake band for the underdrive unit.

Figure 5 is a diagrammatic right side view of a vacuum control means for delaying speed ratio changes.

Figure 6 is cross section of a part of a governor taken on line 7—7.

Figure 7 is a front view of a part of a car holding means, i. e. shaft holding means.

As the drawings are for the most part diagrammatic it is to be understood that details of supports, bearings, connections, and all structures comprising this invention can conform to known principles of construction.

Letters WF, WB, WL, and WR indicate four walls of a transmission case. Reference character 10 identifies a motor; 11 a motor intake manifold; 12 a motor shaft; 15 a section connected to section 12 by a fluid coupling 16; 17 a section connected to section 15 by a planetary gear means 18; 19 a section connected to section 17 by a planetary gear unit 20; and a section 21 termed a propeller shaft connected to and disconnected from section 19 by a manual sliding clutch 22. This clutch is splined at 9 on section 21. Section 21 is supported at 13 in section 19. A countershaft is identified by reference character 23. The shaft section 15 carries a gear 24 rotatable with it, and this gear meshes with another gear 25 secured to shaft 23. Another gear 26 secured to shaft 23 meshes with a gear 27 rotatable on a shaft 28. Gear 27 meshes with another gear 29 that is loosely mounted on shaft 21. Clutch 22 is provided with toothed members 30 and 31. Member 30 meshes with a toothed member 32 secured to shaft 19, and member 31 with a member 33 which is attached to and rotatable with gear 29.

A yoke 34 is incorporated for actuating clutch 22. This yoke extends from a member 35 slidable in suitable supports and carries a pin 36. An arm 37 rotatable on a fixed support 38 is utilized for straddling this pin for actuating member 35 and therewith clutch 22. A slidable bar 39 is provided which is pivotally connected by a link 40 to arm 37 and to a manual lever 41 by a link 42, this lever pivoting on a fixed support 11. When member 30 engages member 32 the transmission is set for forward (automatic) speed operation. When member 31 engages member 33 the device functions in reverse. When clutch 22 is midway between these positions the transmission is in neutral. A gear 43 is loosely mounted on shaft 21. This gear is provided with an overrunning clutch in its hub, this clutch comprising tapered pockets containing rollers 44. Gear 43 meshes with a gear 45 secured to shaft 23. This clutch functions oppositely to those in the planetary units. This clutch makes it possible for the engine to hold the car when coasting on grades or any time the engine idles, as the rollers 44 take hold i. e. tie the gear 43 to shaft 21 when the propeller shaft rotates faster than the motor shaft. For use with the overdrive unit this overrunning clutch can be designed to allow gear 43 to rotate faster than shaft 12 by properly proportioning the gears.

Figure 2 discloses the construction of the planetary units. Any suitable unit may be used. Two specific types will be described, one marked 18, an underdrive device, and another identified by reference character 20, an overdrive mechanism. Shaft 17 is supported at 46 in shaft 15, and a planet carrier 47 is rigidly secured to shaft 15. This carrier is provided with pins 52 and 52'. Planet gears 51'' and 52'' respectively are rotatably mounted on these pins. Also mounted on these pins are gears 51 and 51'. Gear 51 is secured to and rotatable with gear 51''. Gear 51' is secured to and rotatable with gear 52''. An orbit gear 48 is loosely mounted on shaft 17. Its hub is provided with pockets having a taper with rollers 49 in these pockets, the rollers turning on the periphery of shaft 17. Any suitable clutch can be used to serve the purpose of the one described. Secured to shaft 17 is a sun gear 50, which meshes with planet gears 51 and 51'. Obviously this planetary gear construction can be varied as deemed best. A brake band 53 is provided having an offset portion 54 which is linked to operating means to be described shortly, and another offset 54' on this band is attached to any suitable support (support not shown), see Figure 4. The gear ratios in unit 18 can be proportioned to drive the propeller shaft 21 at less speed than the motor shaft 12 when brake band 53 is holding orbit gear 48 in non-rotatable position. Shaft 19 is supported at 55 in shaft 17. The latter shaft is provided with a carrier member 57 that is secured to it and rotatable therewith. This carrier is provided with pins 14 and 14' on which planet gears 58 and 60 respectively are rotatably mounted. A sun gear 61 is secured to shaft 19, this gear meshing with planet gears 58 and 60. An orbit gear 62 similar to orbit gear 48 is loosely mounted on shaft 19. The hub of gear 62 is provided with tapered pockets containing rollers 59. Gears 58 and 60 mesh with gear 62. A band 63 is provided to cooperate with gear 62. This band has an offset 64 which is linked to operating means to be described later. Another offset 64' for attachment to any suitable fixed support (support not shown) is also provided to hold band 63 in rigid position at this point. Actuating means for the bands will now be described. Offset 54 on band 53, unit 18 is connected by a spring 70 to offset 54'. This spring normally holds band 53 in braking position on gear 48. Offset 54 is connected to a slide member 72 by a link 71 by any suitable flexible connection indicated at 73. Member 72 at 74 is attached to a slidable sleeve 75. Slide member 72 is provided with a disc member 76, and sleeve 75 also has a disc shaped member 77. Between these discs is disposed a collar 78 loosely mounted and rotatable on sleeve 75. Between this collar and disc 76 is a thrust bearing 79, and between disc 77 and collar 78 is another thrust bearing 80. Pivotally connected to collar 78 are governor arms 81 and 80'. Pivotally connected to these arms at 6 and 8 are arms 82 and 83 respectively, and arms 82 and 83 are pivoted to a cross arm 84, the latter arm being rigidly secured to a rotatable shaft 85. Arm 84 is provided with stop arms 96 and 97 to block the outward swing of arms 82 and 83 respectively. Springs 98 and 99 respectively are utilized to urge arms 82 and 83 toward shaft 85. This shaft is supported by any suitable means at 86 and 87, this shaft being disposed inside sleeve 75. A beveled gear 88 fastened to shaft 85 meshes with another beveled gear 89 that is secured to a rotatable shaft 90. Shaft 90 is provided with a beveled gear 91 that meshes with another beveled gear 92 which is secured to a rotatable shaft 93. A beveled gear 94 on shaft 93 is meshed with another beveled gear 95 on the propeller shaft 21. Referring to planetary unit 20, its brake band 63 at its offset 64 is held free of its cooperating orbit gear 62 by a spring 64''. Any suitable spring means may be used to serve the purpose of this spring. A slide member 96' having any suitable flexible connection 97' to band offset 64 is attached at 98 to a slidable sleeve 100. Slide member 96' is provided with a disc shaped portion 101. Sleeve 100 carries a disc shaped member 102. Between discs 101 and 102 is a collar 103 rotatable on sleeve 100. Between this collar and disc 101 is disposed a thrust bearing 104, and another thrust bearing 105 is disposed between disc 102 and collar 103. Governor arms 106 and 107 are pivotally connected to collar 103. Another pair of arms 108 and 109 are pivotally connected to arms 106 and 107 at 4 and 5 respectively. Arms 108 and 109 are pivoted on a cross arm 110 that is secured to a rotatable shaft 111 which is disposed inside sleeve 100, this shaft being suitably supported at 112 and 113. Stop arms 96'' and 97'' are provided for blocking the movement of arms 108 and 109 respectively. Springs 98' and 99' are used to oppose the movement of arms 108 and 109 respectively. A beveled gear 114 is secured to shaft 111 and another beveled gear 115 is secured to shaft 90, these gears meshing with each other.

Means for delaying the changing of speed ratios in unit 18 will now be detailed, this delay varying in accordance with varying loads on the gasoline motor. Attached to and movable with slide member 72 is a projection having a tapered surface 116. A slide member 117 carrying a roller 118 is used for contacting surface 116. A lever 119 pivoted at 119' (See Figures 1 and 5) on a suitable support is connected to member 117 by links 120 and 121. A link 122 connects lever 119 to a piston rod 123 (see Figures 1 and 5) in a fluid motor i. e. pneumatic cylinder 124. This cylinder is connected to the motor intake manifold 1 by a tube 150. A piston 126 on rod 123 is urged to the left, as viewed, by a spring 125. While this cylinder is shown inside the transmission case it can of course be disposed outside this case if desired. If disposed inside the case a port 127' may be provided with a tube connection to the atmosphere (this tube not shown in the drawing) said tube passing through the case wall. This delaying mechanism functions in accordance with the vacuum pressures in the intake manifold. When the car load is heavier or the car is ascending a grade and more fuel is fed to the engine, the manifold vacuum pressure decreases whereupon the spring 125 urges the piston 126 to the left as viewed which swings lever 119 in the same direction. This lever by means of its link connection to slide member 117 urges the roller 118 into the path of surface 116 thus blocking movement of member 72 in proportion to the load on the motor. When the engine speeds up and the vacuum pressure increases, the piston 126 moves to the right as the suction overcomes the pressure of spring 125. This withdraws roller 118 from the path of surface 116, and the governor A pulls member 72 and therewith band 53 to its free position whereupon unit 18 functions in direct drive.

Manual means for holding the car when parked on a grade will now be described. The propeller shaft 21 is provided with a squared notch 126'. If preferred a squared collar could be rigidly secured to this shaft in place of the notch. A slide bar 127 is incorporated in the device and has a recess in which a latch bolt 129 is disposed. A pair of rollers 128 and 130 are pivotally mounted on this bolt. A spring 131 is provided to urge this bolt into projected position, i. e. towards shaft 21. A link 132 is used to pivotally connect bar 127 with a bell-crank 133 that is pivoted at 151. Another link 134 pivotally connects this bell-crank to another slide bar 135, and this bar is connected to a lever or handle 136 by a link 137. Lever 136 is pivoted on a fixed support 135'. A cover, not shown, can be provided to enclose the latch 129 and spring 131. A pedal 139 pivoted on a fixed support 140 is connected to handle lever 136 by a link 141. A roller on this pedal is indicated at 142, this roller serving to actuate the motor starter pedal, details of which will be outlined shortly.

*Operation of holding means*

To lock the shaft 21 against rotation lever handle 136 is moved to the left as viewed which moves the slide bar 135 to the right. This causes the bell-crank 133 to rotate counterclockwise which urges slide bar 127 towards shaft 21. If the squared sections of the notch 126' is in proper angular relationship with the rollers 128 and 130 on the bolt 129 these rollers move across it which prevents shaft 21 rotating as each roller is on the opposite side of a perpendicular line passing through this shaft. If the notch is not in such relationship when lever 136 is actuated, and the bolt strikes shaft 21 the spring 131 allows the bolt 129 to be pushed into the bar 127, but as soon as the car moves slightly and shaft 21 rotates, the spring 131 will project the bolt and its rollers across and into the notch 126' on shaft 21, thereby holding this shaft in fixed position. When starting the motor, the pedal 139 is actuated which through roller 142 operates the starter pedal and simultaneously by means of its link connection to bar 135 moves the bolt out of the path of shaft 21, thus preventing car starting with this shaft in locked condition.

*Operation of transmission*

When the usual accelerator is actuated the motor increases its speed of rotation with the fluid clutch 16 decreasing in its slippage with increased rotation. A manual clutch (not shown) of conventional design could be substituted for the coupling 16 but would require manual operation when the car comes to a stop. With clutch 22 set for forward driving and fluid coupling 16 driving shaft 15, carrier 47 rotates clockwise with its planet gears rotating counter-clockwise as they travel around the inside of orbit gear 48. These planet gears rotate the sun gear 50 clockwise which drives shaft 17 with it. At this time the band 63 on orbit gear 62 is loose with the planetary unit 20 operating in direct drive, due to the pull of this gear 62 on the shaft 19 because this gear has moved to the position whereby its tapered pockets bind on rollers 59 thus locking shafts 17 and 19 together. With increased car speed the governor A will in accordance with this speed by means of its arms which swing outward, pull the brake band 53 away from orbit gear 48. This progressively releases gear 48 and it takes on a condition of slippage between itself and this band, this slippage increasing with increased car speed until this gear forms a direct drive by means of the rollers 49, these rollers locking shafts 15 and 17 together due to the tapered pockets in the hub of gear 48 binding on these rollers. During this slippage the motor always drives the shaft 21 through the combined operations of the orbit gear 48, planet gears on carrier 47, and the sun gear 50. When the car slows down the governor A slows down in its rotation progressively which progressively allows the band 53 to progressively stop rotation of orbit gear 50, which when fully stopped sets unit 18 for minimum low speed operation. When this unit functions in direct drive and the car has attained the predetermined speed for the governor B to progressively set the band 63, orbit gear 62 will progressively slow down in its rotation until the band stops its rotation completely whereupon the unit 20 will function at the maximum overdrive speed. When the car slows down the governor B will progressively loosen the band 63 until gear 62 sets up a direct drive.

This transmission is a speed changing mechanism of continuous variability between minimum low speed and direct drive, and between direct drive and maximum overdrive. If properly proportioned it has continuous variability in speed from minimum low to maximum high with the use of only two gear units. If the overdrive unit is eliminated, only one planetary unit is required for continuous variable speed from low to direct drive, thus providing a very simple transmission.

From the foregoing it will be seen that while a preferred embodiment of this invention has been disclosed, it is not desired to restrict the details to the exact construction shown, it being obvious that changes not involving invention may be made without conflicting with the spirit of the invention and the scope of the claims.

What I claim is:

1. In a speed changing mechanism, speed changing means including in combination a single planetary unit comprising in combination a planet carrier having cooperative planet gears thereon arranged in coacting pairs, each pair having gears of different diameters, one being larger and one smaller that rotate simultaneously as a single unit, said gears being rigidly secured to each other, a sun gear, and an orbit gear having a circumferential surface, said gears functioning in corelated speed ratios, driving means for said unit, said planet carrier secured to and rotatable with said driving means, driven means actuated by said unit, said sun gear secured to and rotatable with said driven means, said larger planet gear cooperating with said orbit gear, said smaller planet gear cooperating with said sun gear, said driving means and said driven means having variable relative speeds, said unit varying these speeds, control means comprising in combination braking means cooperating with said circumferential surface for changing said speed ratios thereby changing the relative speeds of said driving means and said driven means, movable means connected to and for actuating said braking means, pivotal means for actuating said movable means, operating means comprising a plurality or parts for actuating said pivotal means, actuating means for actuating said operating means, and rigidly fixed immovable supporting means for said actuating means.

2. In a speed changing mechanism, speed changing means including in combination a single planetary unit comprising in combination a planet carrier having cooperative planet gears thereon arranged in coacting pairs each pair having gears of different diameters one being larger and one smaller that rotate simultaneously as a single unit, said gears being rigidly secured to each other, a sun gear, and an orbit gear having a circumferential surface, said gears functioning in corelated speed ratios, driving means for said unit, said planet carrier secured to and rotatable with said driving means, driven means actuated by said unit, said sun gear secured to and rotatable with said driven means, said larger planet gear cooperating with said orbit gear, and said smaller planet gear cooperating with said sun gear, said driving means and said driven means having unequal and similar speeds, said unit varying these speeds, control means comprising in combination a brake band cooperating with said circumferential surface for changing said speed ratios thereby changing the speeds of said driving means and said driven means from unequal to similar speeds, movable means connected to and for actuating said brake band, pivotal means for actuating said movable means, rotary means for actuating said pivotal means, and means undetachably connected to and for actuating said rotary means.

3. In a speed changing mechanism, speed changing means including in combination a single planetary unit comprising in combination a planet carrier having cooperative planet gears thereon arranged in coacting pairs each pair having gears of different diameters one being larger and one smaller that rotate simultaneously as a single unit, said gears being rigidly secured to each other, a sun gear, and an orbit gear having a circumferential surface, said gears functioning in corelated speed ratios, driving means for said unit, said planet carrier secured to and rotatable with said driving means, driven means actuated by said unit, said sun gear secured to and rotatable with said driven means, said larger planet gear cooperating with said orbit gear, and said smaller planet gear cooperating with said sun gear, said driving means and said driven means having similar speeds and unequal speeds, said unit varying these speeds, control means comprising in combination a brake band cooperating with said circumferential surface for changing said speed ratios thereby changing the speeds of said driving means and said driven means from similar to unequal speeds, movable means connected to and for actuating said brake band, pivotal means for actuating said movable means, linkage for actuating said pivotal means, and means undetachably connected to and for actuating said linkage.

4. In a speed changing mechanism, speed changing means including in combination a single planetary unit comprising in combination a planet carrier having cooperative planet gears thereon arranged in coacting pairs, each pair having gears of different diameters, one being larger and one smaller that rotate simultaneously as a single unit, said gears being rigidly secured to each other, a sun gear, and an orbit gear having a circumferential surface, said gears functioning in corelated speed ratios, driving means for said unit, said planet carrier secured to and rotatable with said driving means, driven means actuated by said unit, said sun gear secured to and rotatable with said driven means, said larger planet gear cooperating with said orbit gear, said smaller planet gear cooperating with said sun gear, said driving means and said driven means having variable relative speeds, said unit varying these speeds, control means comprising in combination a brake band cooperating with said circumferential surface for changing said speed ratios thereby changing the relative speeds of said driving means and said driven means, movable means connected to and for actuating said brake band, pivotal means for actuating said movable means, linkage for actuating said pivotal means, and means undetachably connected to and for actuating said linkage.

5. In a speed changing mechanism, planetary speed changing means including in combination a sun gear, planet gears and an orbit gear, braking means for said orbit gear, actuating means for said braking means, means movable into and out of path of movement of said actuating means for checking said actuating means, and pneumatic means for actuating said checking means.

CLIVE W. LANPHERE.

REFERENCES CITED

The following references are of record in the file of this patent:

UNITED STATES PATENTS

| Number | Name | Date |
|---|---|---|
| 942,192 | Barton | Dec. 7, 1909 |
| 1,192,704 | Stobe | July 25, 1916 |
| 1,430,799 | Davis | Oct. 3, 1922 |
| 1,498,840 | Hasselbring | June 24, 1924 |
| 1,548,428 | Alspaugh | Aug. 4, 1925 |
| 1,606,639 | Johnson | Nov. 9, 1926 |
| 1,609,782 | Small | Dec. 7, 1926 |
| 1,706,553 | Stucatur | Mar. 26, 1929 |
| 1,839,145 | Forichon | Dec. 29, 1931 |
| 2,005,167 | Roeder | June 18, 1935 |
| 2,071,428 | Prince | Feb. 23, 1937 |
| 2,119,431 | Gommel | May 31, 1938 |
| 2,140,690 | Cotterman | Dec. 20, 1938 |
| 2,150,983 | Murray | Mar. 21, 1939 |
| 2,173,659 | Patterson | Sept. 19, 1939 |
| 2,174,835 | Rainsford | Oct. 3, 1939 |
| 2,181,699 | Leichsenring | Nov. 28, 1939 |
| 2,201,847 | Cheng | May 21, 1940 |
| 2,221,180 | Cotterman | Nov. 12, 1940 |
| 2,303,519 | Wilson et al. | Dec. 1, 1942 |
| 2,316,390 | Biermann | Apr. 13, 1943 |
| 2,328,813 | Lanphere | Sept. 7, 1943 |
| 2,379,808 | Lanphere | July 3, 1945 |
| 2,402,248 | Hale | June 18, 1946 |